United States Patent
Ciet et al.

(10) Patent No.: US 10,164,772 B2
(45) Date of Patent: Dec. 25, 2018

(54) PERMUTATION COMPOSITION BASED HASH FUNCTION

(71) Applicant: Apple Inc., Cupertino, CA (US)

(72) Inventors: Mathieu Ciet, Paris (FR); Augustin J. Farrugia, Los Altos Hills, CA (US); Thomas Icart, Paris (FR)

(73) Assignee: Apple Inc., Cupertino, CA (US)

(*) Notice: Subject to any disclaimer, the term of this patent is extended or adjusted under 35 U.S.C. 154(b) by 213 days.

(21) Appl. No.: 14/291,581

(22) Filed: May 30, 2014

(65) Prior Publication Data

US 2016/0119133 A1 Apr. 28, 2016

(51) Int. Cl.
*H04L 9/06* (2006.01)

(52) U.S. Cl.
CPC ........ *H04L 9/0643* (2013.01); *H04L 2209/20* (2013.01)

(58) Field of Classification Search
CPC . H04L 1/0007; H04L 1/0008; H04L 2209/20; H04L 9/0643
See application file for complete search history.

(56) References Cited

U.S. PATENT DOCUMENTS

| 8,244,909 B1 | 8/2012 | Hanson et al. |
| 8,300,828 B2 | 10/2012 | Ciet et al. |
| 2002/0078011 A1* | 6/2002 | Lee .................. G06F 7/762 |
| 2004/0081202 A1* | 4/2004 | Minami ............. H04L 12/2602 |
| | | 370/469 |
| 2004/0086114 A1* | 5/2004 | Rarick ................. H04L 9/0625 |
| | | 380/29 |
| 2005/0099869 A1* | 5/2005 | Crinon .................. H04N 19/44 |
| | | 365/222 |
| 2007/0156644 A1* | 7/2007 | Johnson ............... G06F 21/577 |
| 2010/0040226 A1 | 2/2010 | Ideguchi et al. |
| 2012/0201373 A1 | 8/2012 | Hua et al. |
| 2014/0093073 A1 | 4/2014 | Horgan et al. |

(Continued)

OTHER PUBLICATIONS

Hamilton, "Cryptography and Number Theory", Nov. 18, 2012, p. 1-16, Dublin City University.*

(Continued)

*Primary Examiner* — Samson B Lemma
*Assistant Examiner* — Arya Golriz
(74) *Attorney, Agent, or Firm* — Womble Bond Dickinson (US) LLP

(57) ABSTRACT

The disclosed hash and message padding functions are based on the permutation composition problem. To compute a hash of a message using permutation composition based hashing, the message is split into equal size blocks. For each block, a permutation composition value is computed. The block permutation composition values are then combined through composition to generate an overall permutation composition value. The hash of the message is then based on the overall permutation composition value. To pad a message using permutation composition based padding, the message is split into equal size blocks. For each block, a permutation composition value is computed and the permutation composition value is added to the block. The padded blocks are then recombined to generate the padded message.

18 Claims, 11 Drawing Sheets

(56) References Cited

U.S. PATENT DOCUMENTS

2014/0204945 A1* 7/2014 Byun ................ H04L 45/74
                                                    370/392
2015/0186139 A1* 7/2015 Wolrich ............ G06F 9/30036
                                                    712/208

OTHER PUBLICATIONS

Kuhn, "Side-Channel Attacks on Textbook RSA and ElGamal Encryption", 2003, Dresdner Bank, p. 324-336.*
Bernstein, "Salsa20 Speed", Apr. 27, 2005, The University of Illinois at Chicago, p. 1-17.*

* cited by examiner $$P_0 = \begin{pmatrix} 0 & 1 & 2 \\ 0 & 1 & 2 \end{pmatrix} \qquad P_1 = \begin{pmatrix} 0 & 1 & 2 \\ 0 & 2 & 1 \end{pmatrix}$$

$$P_2 = \begin{pmatrix} 0 & 1 & 2 \\ 2 & 1 & 0 \end{pmatrix} \qquad P_3 = \begin{pmatrix} 0 & 1 & 2 \\ 1 & 2 & 0 \end{pmatrix}$$

$$P_4 = \begin{pmatrix} 0 & 1 & 2 \\ 1 & 0 & 2 \end{pmatrix} \qquad P_5 = \begin{pmatrix} 0 & 1 & 2 \\ 2 & 0 & 1 \end{pmatrix}$$

FIG. 1

$$P_1 \circ P_2 = \begin{pmatrix} 0 & 1 & 2 \\ 0 & 2 & 1 \end{pmatrix} \circ \begin{pmatrix} 0 & 1 & 2 \\ 2 & 1 & 0 \end{pmatrix}$$

$$= \begin{pmatrix} 0 & 1 & 2 \\ P_1(P_2(0)) & P_1(P_2(1)) & P_1(P_2(2)) \end{pmatrix}$$

$$= \begin{pmatrix} 0 & 1 & 2 \\ P_1(2) & P_1(1) & P_1(0) \end{pmatrix}$$

$$= \begin{pmatrix} 0 & 1 & 2 \\ 1 & 2 & 0 \end{pmatrix}$$

FIG. 2

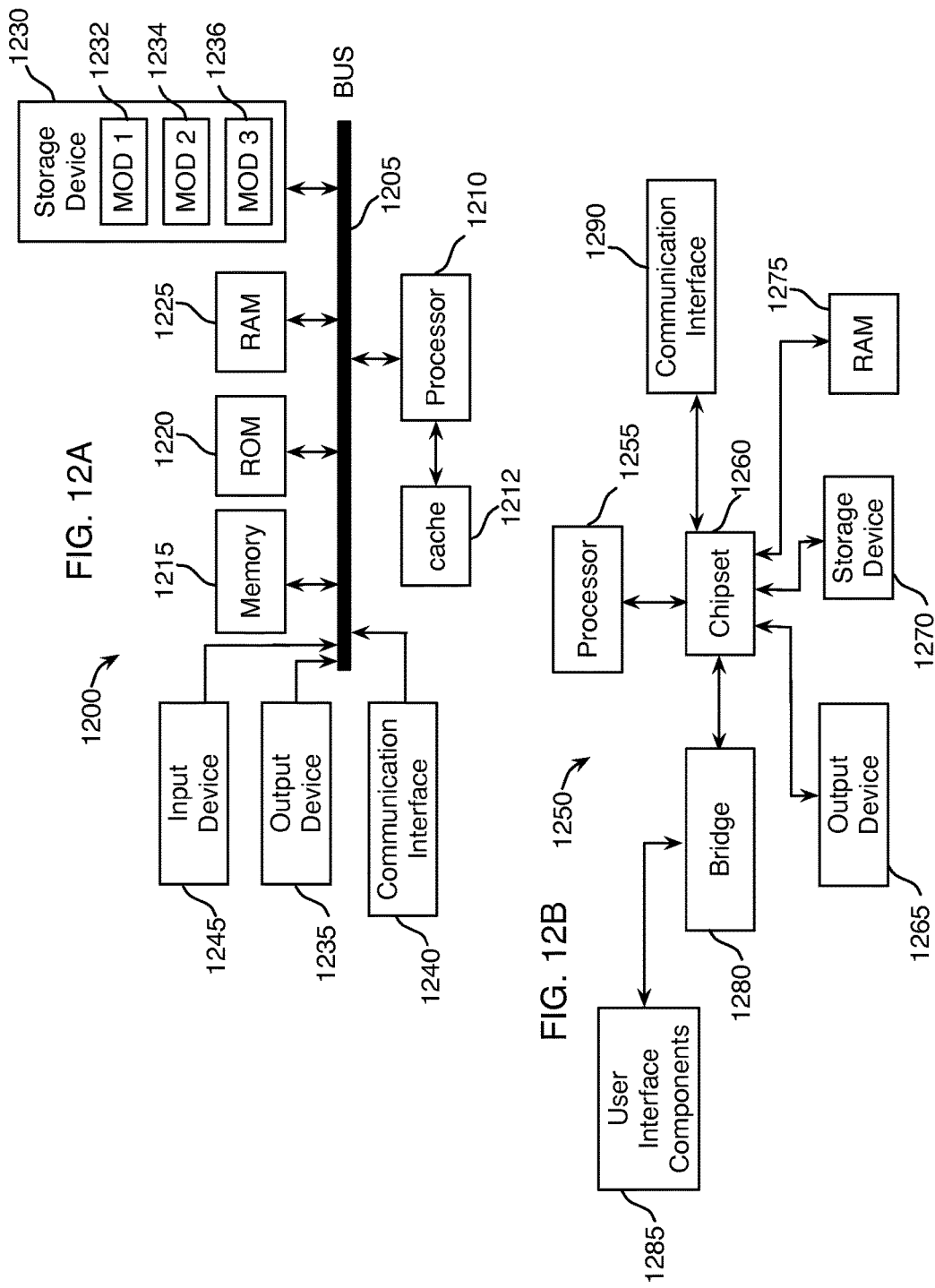

PERMUTATION COMPOSITION BASED HASH FUNCTION

TECHNICAL FIELD

The present technology pertains to software security, and more specifically pertains to a hash function that can be used in conjunction with cryptography.

BACKGROUND

In modern cryptography, one common methodology used to design strong systems is to base the system on mathematical problems that are considered algorithmically hard to solve. For example, many cryptographic systems are based on factorization or discrete logarithms, both mathematically difficult problems. This approach is very efficient, and was one of the key elements in transforming the art of cryptography into a real science. One aspect leading to the success is that mathematically hard problems have provable levels of security, thus making it possible to mathematically prove certain security features of a cryptographic system.

Even though the security of a cryptographic system can be proven, if the cryptographic system is implemented in software and running on a client application, the cryptographic system may still be vulnerable to reverse engineering attacks. This is particularly true if the cryptographic system is based on well known or commonly used mathematically difficult problems. Accordingly, any improvements or variations to these components can enhance the security afforded by cryptographic security schemes.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating a hash value for a message and padding message. The disclosed permutation composition based hash function can be used to generate a hash value for a message that has a provable level of security by leveraging the permutation composition problem. The permutation composition based hash function can split a message M into a set of equally sized blocks of a specified block size. Additionally, the hash function can obtain a set of n+1 permutations $\{P_0, , P_{n-1}, P_n\}$ that permute a set of unique values. For example, the hash function can obtain a set of 256 permutations, which permute 1024 unique values. After obtaining the set of permutations, the hash function can initialize an accumulated message permutation value $P_{acc}$ and generate a block permutation value $P_{c_i}$ for each block based on the set of permutations. The hash function can then update the accumulated message permutation value $P_{acc}$ by composing it with each block permutation value. For example, the hash function can update $P_{acc}$ such that $P_{acc}=P_{c_i} \circ P_{acc} \circ P_{c_i}$. Once each block in the message has been processed, the hash a, function can generate the message hash based on the accumulated message permutation value. In some cases, the message hash can be a first set of bytes from the accumulated message permutation value, a last set of bytes from the accumulated message permutation value, and/or the exclusive or of two or more bytes of the accumulated message permutation value.

To compute a block permutation composition value for a block, the hash function can begin computing the block permutation value $P_{c_i}$ for a block $b_i$ by initializing the block permutation value $P_{c_i}$ such that $P_{c_i}=P_n$ and a value y to the value of the block $b_i$. Once the initialization phase is complete, the hashing function can generate the integer sequence and composition of permutations for the block $b_i$ by computing s=y mod n and updating the block permutation value $P_{c_i}$ such that $P_{c_i}=P_s \circ P_{c_i}$. Additionally, the hash function can update y by computing y=y/n. Once the hash function has processed each block, the hash function can perform a last update of the block permutation value $P_{c_i}$ for a block $b_i$ such that $P_{c_i}=P_{c_i} \circ P_n$.

The disclosed permutation composition based message padding function can be used to generate a padded message that can be supplied to a hash function. The permutation composition based message padding function can split a message M into a set of equally sized blocks of a specified block size. Additionally, the message padding function can obtain a set of n+1 permutations $\{P_0, , P_{n-1}, P_n\}$ that permute a set of unique values. For example, the message padding function can obtain a set of 17 permutations, which permute 16 unique values. After obtaining the set of permutations, the message padding function can generate a block permutation value for each block based on the set of permutations. The message padding function can then represent the block permutation value as a q-byte value, such as an 8-byte value. Then the message padding function can combine the block and the q-byte value to generate a padded block. Once each block in the message has been processed, the message padding function can re-assemble the message using the padded blocks to generate a padded message.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates an exemplary set of permutations;

FIG. 2 illustrates an exemplary permutation composition;

FIGS. 12A and 12B illustrate exemplary system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Cryptographic systems generally include several components, such as a signature generator, encryption/decryption functions, and/or at least one hash function. The disclosed technology addresses the need in the art for an alternative hash function. Specifically, the hash function disclosed is a permutation composition based hashing function that leverages the difficulty of the permutation composition problem to achieve a provable level of security. The permutation composition problem is defined as: given a permutation P and a set of permutations $\{P_1, , P_n\}$, find an integer sequence $s_1, , s_n$ that $P=P_{s_1} \circ \circ P_{s_n}$, where $P_{s_i} \in \{P_1, , P_n\}$. The idea behind the permutation composition problem is that it is computationally difficult to determine the integer sequence as the number of elements in a permutation increases. A reason for this is that as the number of elements increases so does the number of possible permutations. Therefore, it becomes computationally difficult to determine which permutations from all possible permutations make up the set of permutations, and further the order in which the permutations are composed.

To illustrate the permutation composition problem consider a very simple set of elements $X=\{0,1,2\}$. There are six possible permutations of the elements in X, which are illustrated in FIG. 1. Suppose the set of permutations is $\{P_0, P_1, P_2\}$ and the integer sequence is 1, 2, 0 such that $P=P_1 \circ P_2 \circ P_0$. The composition of $P_1$ and $P_2$ generates the permutation $P_3$, as illustrated in FIG. 2. Additionally, because $P_0$ is the identity permutation, the composition of $P_3$ and $P_0$ is $P_3$. However, the permutation $P_3$ can also be generated by $P=P_0 \circ P_1 \circ P_2$, $P=P_1 \circ P_0 \circ P_2$, or $P=P_0 \circ P_3$. Therefore, it would be difficult to reverse engineer the set of permutations used and the sequence of integers. Extending this idea to a larger set of elements, and therefore a larger set of possible permutations, the problem of determining the set of permutations and the particular sequence of those permutations used to generate the given permutation becomes increasing more difficult.

Figure 3:
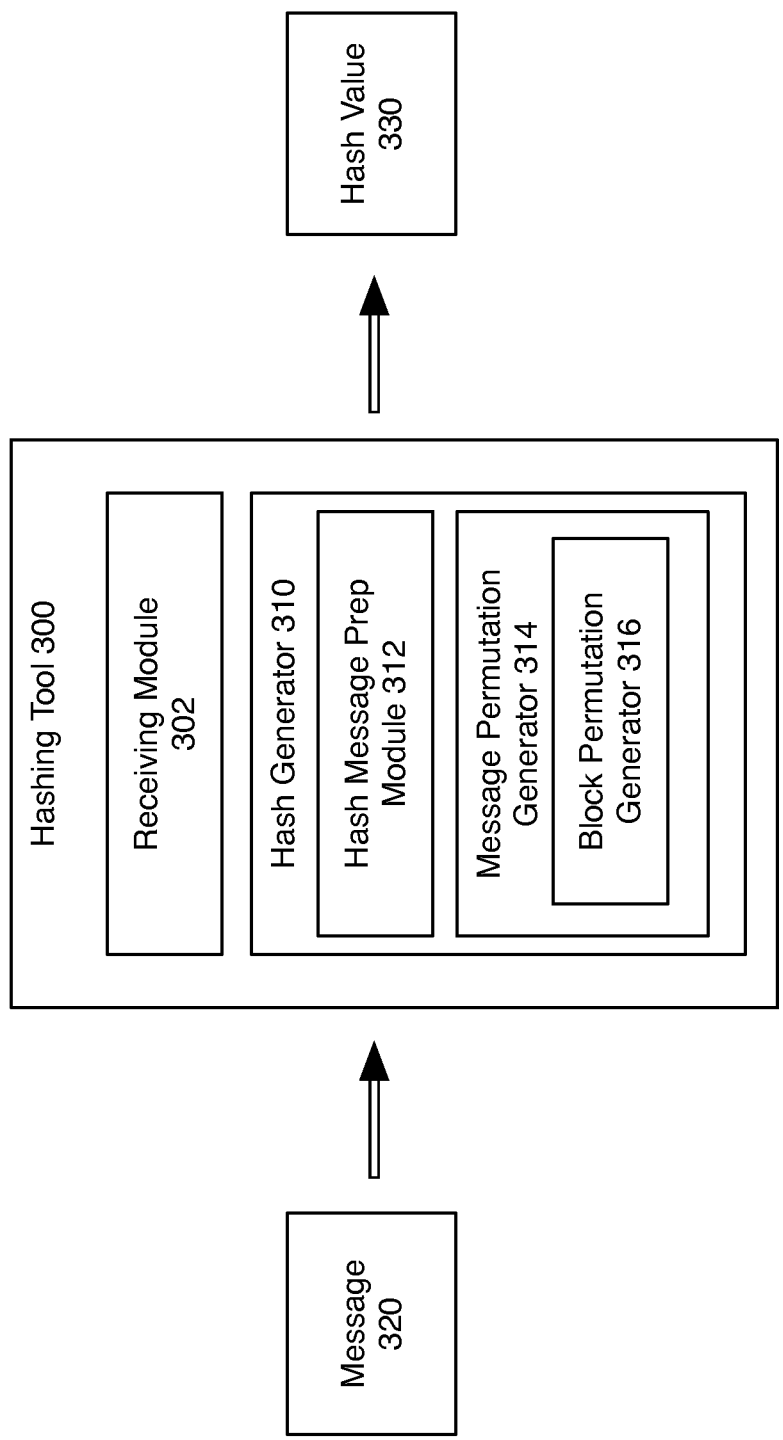
FIG. 3 illustrates an exemplary permutation composition hash tool.

A permutation composition based hash function can be applied to a message using a hashing tool that receives a message and outputs a hash value. FIG. 3 illustrates an exemplary hashing tool 300. Hashing tool 300 takes as input message 320, which can be any sequence of bytes of any length.

Hashing tool 300 can include one or more modules for computing a hash value 330 for an input message 320, e.g., receiving module 302, hash generator 310, hash message prep module 312, message permutation generator 314, and block permutation generator 316. Each of the modules in FIG. 3 is discussed in more detail below; however, it should be understood by one skilled in the art, that the architectural configuration illustrated in FIG. 3 is simply one possible configuration and that other configurations with more or less components are also possible.

Hashing tool 300 can include receiving module 302. Receiving module 302 can be configured to receive input message 320 and pass input message 320 to hash generator 310. Receiving module 302 can also be configured to receive other input values, such as block size and information identifying a set of permutations.

Hash generator 310 can be configured to include one or more modules for generating a permutation composition based hash value for input message 320. Hash generator 310 can include hash message prep module 312. Upon receiving input message 320, hash message prep module 312 can determine whether the length of input message 320 is a multiple of a specified block size, such as 64 bytes. In some cases, the block size can be an input to hashing tool 300. For example, a block size can be specified as a command line parameter to hashing tool 300. When hash message prep module 312 determines that input message 320 has a length that is not a multiple of the specified block size, hash message prep module 312 can pad input message 320 with enough junk bytes to reach the next multiple of the specified block size. For example, if the block size is 64 bytes and the message length is 120 bytes, hash message prep module 312 can pad the message with 8 junk bytes. Depending on the configuration, the hash message prep module 312 can prepend the junk bytes to the beginning of input message 320 and/or append the junk bytes to the end of input message 320. The junk bytes can be a predefined byte, such as 0x00. Once message hash prep module 312 has ensured that input message 320 has a length that is a multiple of a specified block size, message hash prep module 312 can split input message 320 into a sequence of blocks, where each block has a length equal to the specified block size.

After message hash prep module 312 splits input message 320 into a set of blocks, message permutation generator 314 can accumulate a message permutation value across all of the blocks in input message 320. To do this, message permutation generator 314 can obtain a set of n+1 permutations $\{P_0, , P_{n-1}, P_n\}$ that permute a set of unique values. For example, message permutation generator 314 can obtain a set of 256 permutations, which permute 1024 unique values. The set of permutations can be predefined in hashing tool 300. Alternatively, the set of permutations can be obtained based on input information identifying the set of permutations received by receiving module 302. For example, receiving module 302 may receive the set of permutations, such as in an input file. In another example, receiving module 302 may receive a permutation identifier that message permutation generator 314 can use to select the set of permutations from a database of sets of permutations connected to or part of hashing tool 300. In yet another example, receiving module 302 may receive a seed value that message permutation generator 314 can use to generate the set of permutations.

After obtaining the set of permutations, message permutation generator 314 can apply block permutation generator 316 to each block in the message to generate a block permutation value for each block based on the set of permutations.

Message permutation generator 314 can then update the accumulated message permutation value by composing it with each block permutation value. Once each block in input message 320 has been processed, message permutation generator 314 can generate the message hash based on the accumulated message permutation value. The manner in which message permutation generator 314 generates the message hash from the accumulated message permutation value can vary with the configuration. For example, the message hash can be a first set of bytes from the accumulated message permutation value, a last set of bytes from the accumulated message permutation value, and/or the exclusive or of two or more bytes of the accumulated message permutation value. In some cases, the manner in which message permutation generator 314 generates the message hash from the accumulated message permutation value can be specified as an input value to hashing tool 300. For example, the input may specify a number of bytes and/or how the bytes are extracted from the accumulated message permutation value.

Figure 4:
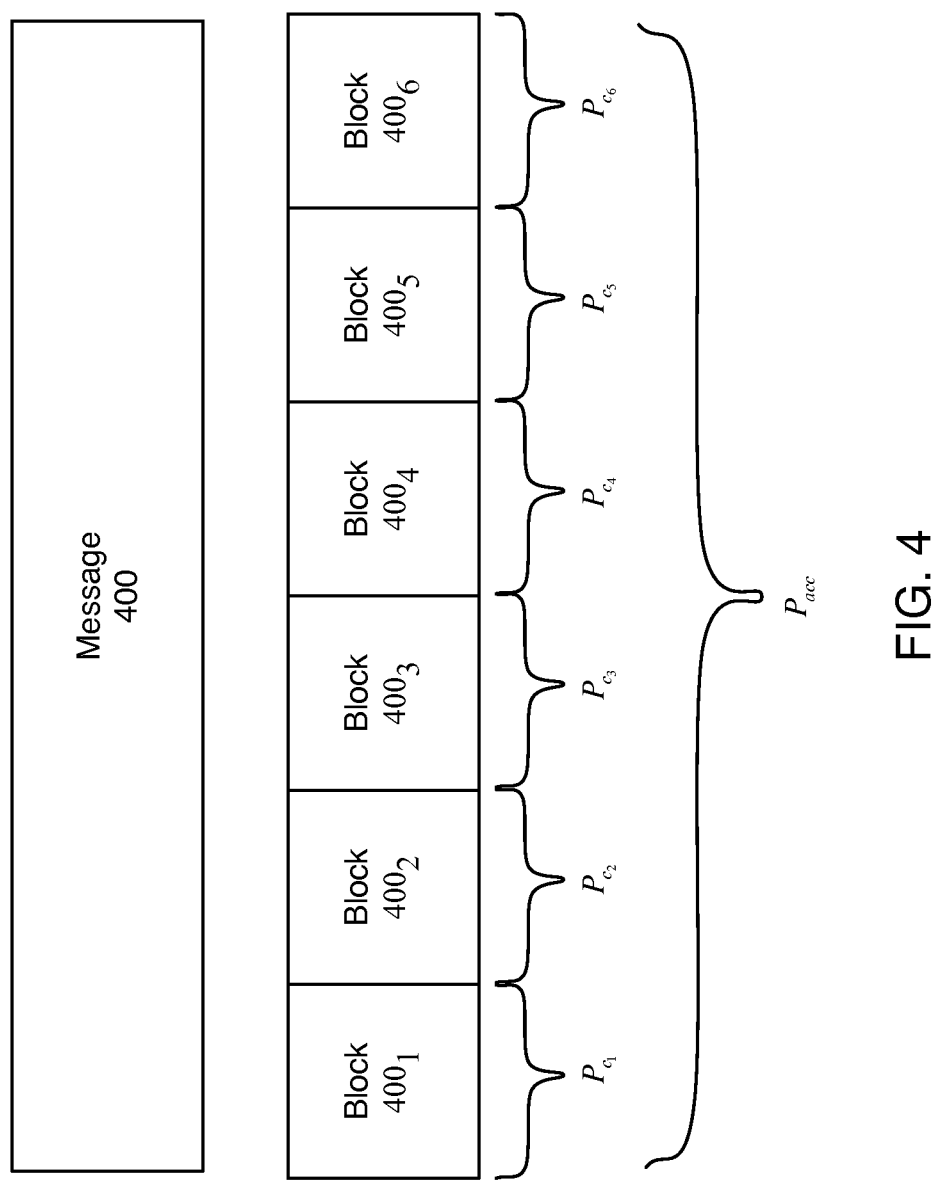
FIG. 4 illustrates hashing a message using permutation composition based hashing.

FIG. 4 illustrates the general idea of hashing a message using permutation composition based hashing. The hashing technique begins with message 400. Message 400 is then split into a set of blocks, in this example, blocks $400_1, \ldots, 400_6$. For each of the blocks a block permutation value $P_{c_i}$ is generated. The block permutation values are combined using composition to generate a message permutation value $P_{acc}$. The message hash is then extracted from the message permutation value $P_{acc}$.

The message permutation value, for a message M split into a set of blocks $\{b_0, , b_m\}$, where each block has a block size r, can be generated according to the pseudo code below for a given set of n+1 permutations $\{P_0, , P_{n-1}, P_n\}$ and a block permutation function $C_r(b_i)$:

```
P_acc = P_n;
for (i = 0; i <= m; i++){
    P_c_i = C_r(b_i);
    P_acc = P_c_i ∘ P_acc ∘ P_c_i;
}
return extraction of P_acc;
```

The block permutation value for a block $b_i$ can be generated according to the $C_r(b_i)$ function as shown in the pseudo code below for a given block size r:

```
P_c = P_n;
y = b_i;
for (i = 0; i < r; i++) {
    s = y % n /* generate the sequence from the block */
    P_c = P_s ∘ P_c; /* composition of permutations */
    y = y / n; /* integer division */
}
P_c = P_c ∘ P_n;
return P_c;
```

In some cases, hashing tool 300 can include special purpose instructions that can be used to improve the efficiency of the permutation composition. For example, the Intel CPU includes the SSE3 instruction set, which contains the _mm_shuffle_eip8 instruction. This instruction can be used to compute the permutation composition in a single instruction for permutations of size sixteen or less. This can improve the speed of the block permutation function $C_r(b_i)$, and the hash function overall.

Figure 5:
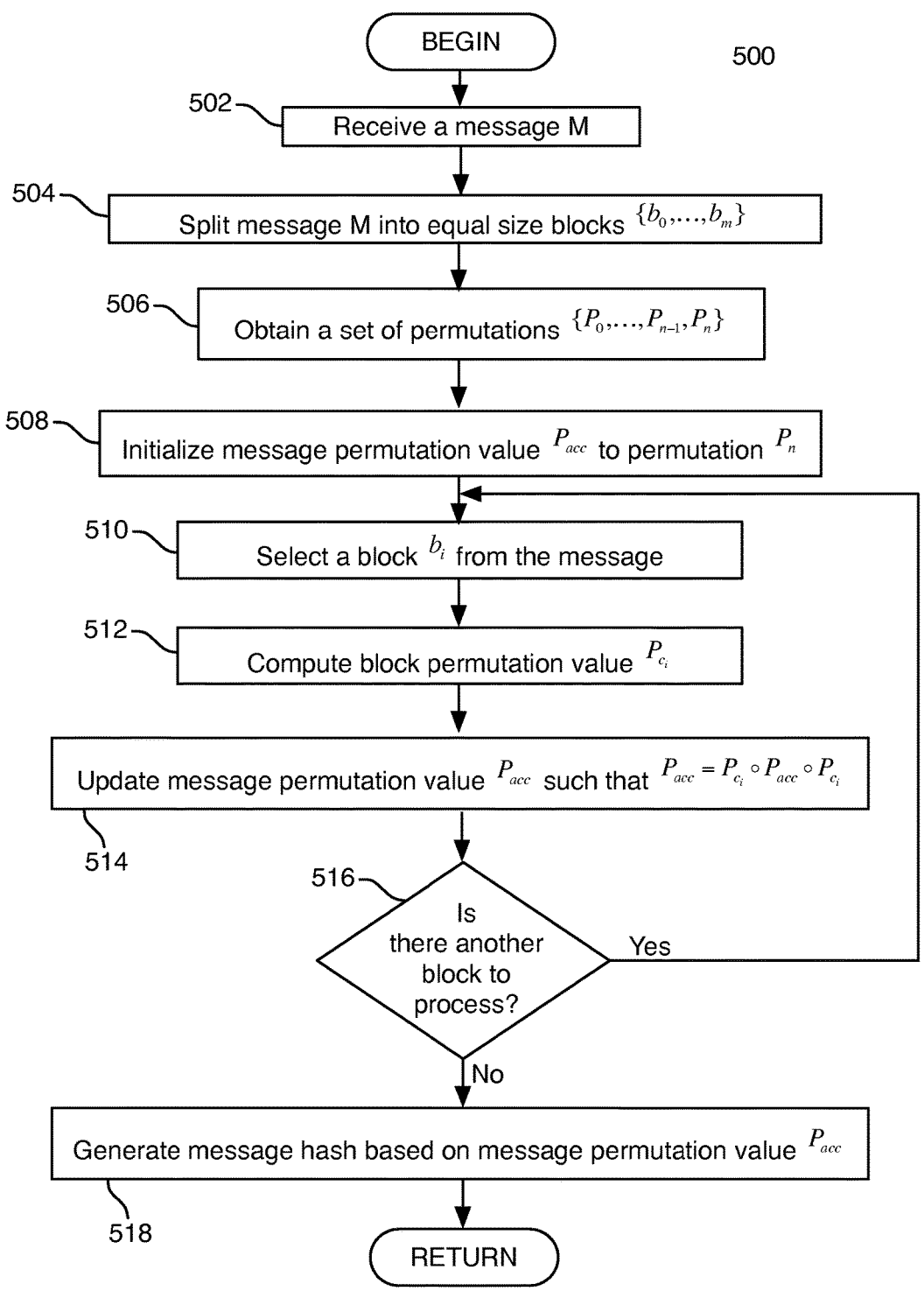
FIG. 5 illustrates an exemplary method embodiment for generating a hash for a message using permutation composition based hashing.

FIG. 5 is a flowchart illustrating exemplary method embodiment 500 for generating a hash for a message using permutation composition based hashing. For the sake of clarity, this method is discussed in terms of an exemplary hashing tool, such as is shown in FIG. 3. Although specific steps are shown in FIG. 5, in other embodiments a method can have more or less steps than shown.

At some point, hashing tool 300 can receive a message to be hashed using the permutation composition based hashing technique (502). In addition to the message, hashing tool 300 can receive one or more other parameters, such as a block size or permutation identifying information. For example, hashing tool 300 may receive the set of permutations, such as in an input file. In another example, hashing tool 300 may receive a permutation identifier that hashing tool 300 can use to select the set of permutations from a database of sets of permutations connected to or part of hashing tool 300. In yet another example, hashing tool 300 may receive a seed value that hashing tool 300 can use to generate the set of permutations.

After receiving a message to hash, hashing tool 300 can split the message into a sequence of blocks $\{b_0, , b_m\}$, where each block has a length equal to a specified block size (504), such as 64 bytes. In some cases, the length of the message may not be a multiple of the specified block size. When this occurs, hashing tool 300 can pad the message with enough junk bytes to reach the next multiple of the specified block size. The placement of the padding bytes can vary with the configuration. For example, hashing tool 300 can prepend and/or append the junk bytes to the message.

Hashing tool 300 can also obtain a set of n+1 permutations $\{P_0, , P_{n-1}, P_n\}$ (506). For example, hashing tool 300 can obtain a set of 256 permutations that permute 1024 unique values. The set of permutations can be predefined in hashing tool 300 or can be obtained based on input information identifying the set of permutations. For example, hashing tool 300 may receive the set of permutations, a permutation identifier that can be used to select the set of permutations from a database, or a seed value that hashing tool 300 can use to generate the set of permutations.

Once hashing tool 300 has split the message and obtained the set of permutations, hashing tool 300 can begin generating the hash value by initializing a message permutation value $P_{acc}$ to permutation $P_n$ from the set of permutations (508). After initializing the message permutation value $P_{acc}$, hashing tool 300 can select a block $b_i$ from the message (510) and compute a block permutation value $P_{c_i}$ for the block $b_i$ (512). The hashing tool 300 can compute the block permutation value $P_{c_i}$ using a variety of techniques, such as the block permutation value computation in method 600 in FIG. 6, described below. Using the block permutation value $P_{c_i}$, hashing tool 300 can update the message permutation value $P_{acc}$ such that $P_{acc} = P_{c_i} \circ P_{acc} \circ P_{c_i}$ (514).

After updating the message permutation value $P_{acc}$, hashing tool 300 can determine whether there is another block in the message block sequence to process (516). If there is another block, hashing tool 300 can repeat the process of selecting a block (510), computing the block permutation value for the selected block (512), and updating the message permutation value (514).

Once all of the blocks have been processed, hashing tool 300 can generate a message hash based on the message permutation value $P_{acc}$ (518). The manner in which hashing tool 300 generates the message hash from the accumulated message permutation value can vary with the configuration. For example, the message hash can be a first set of bytes from the accumulated message permutation value, a last set of bytes from the accumulated message permutation value, and/or the exclusive or of two or more bytes of the accumulated message permutation value. After extracting the bytes from the accumulated message permutation value $P_{acc}$, hashing tool 300 can resume previous processing, which can include repeating method 500.

Figure 6:
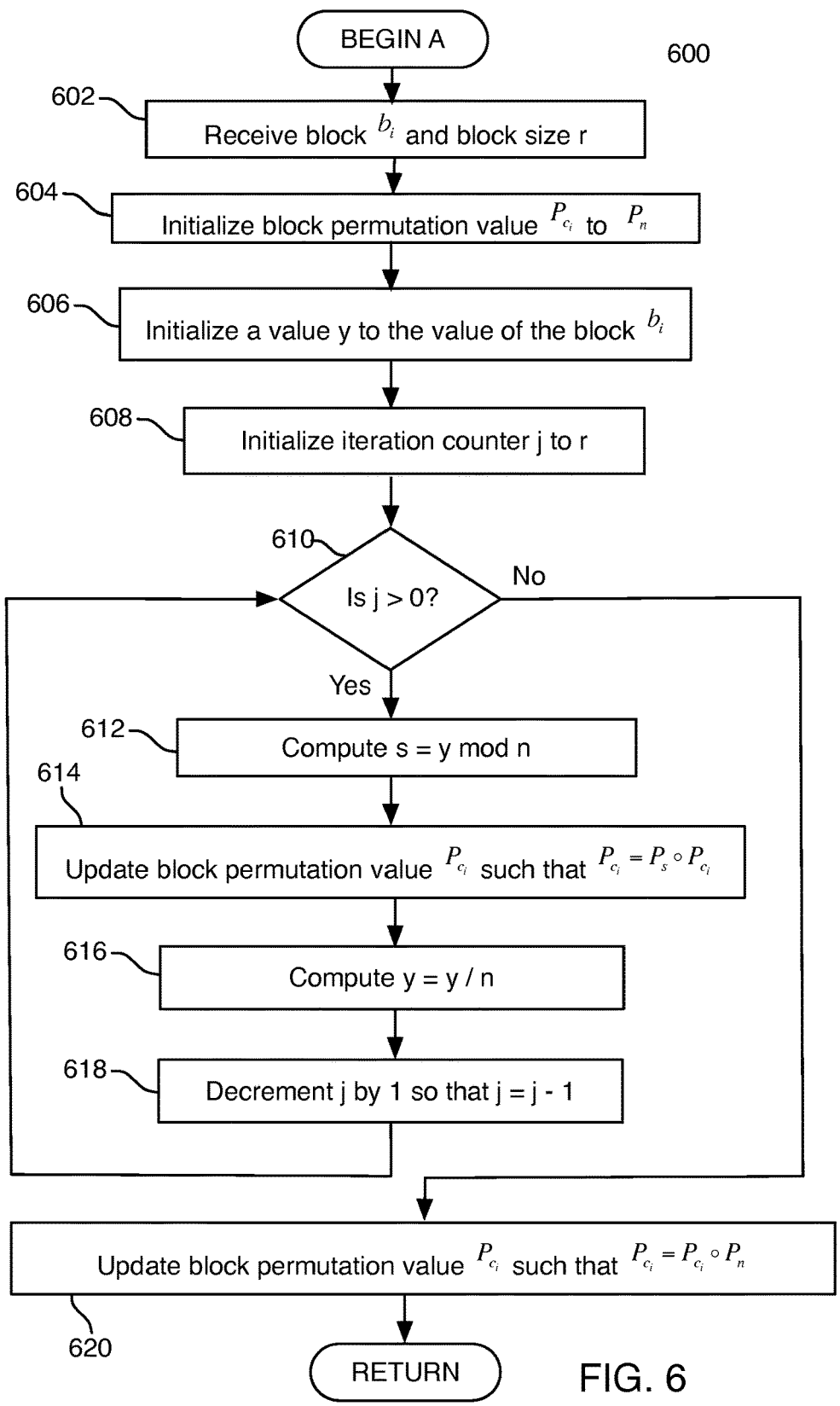
FIG. 6 illustrates an exemplary method embodiment for computing a permutation value for a block.

FIG. 6 is a flowchart illustrating exemplary method embodiment 600 for computing a block permutation value $P_{c_i}$ for a block $b_i$. For the sake of clarity, this method is discussed in terms of an exemplary hashing tool, such as is shown in FIG. 3. Although specific steps are shown in FIG. 6, in other embodiments a method can have more or less steps than shown.

Method 600 begins when hashing tool 300 receives the block $b_i$, the block size r, and the set of n+1 permutations $\{P_0, , P_{n-1}, P_n\}$ (602). Hashing tool 300 can begin computing the block permutation value $P_{c_i}$ for a block $b_i$ by initializing the block permutation value $P_{c_i}$ such that $P_{c_i} = P_n$ (604), a value y to the value of the block $b_i$ (606), and an iteration counter j such that j=r (608).

Once the initialization phase is complete, hashing tool 300 can check if the iteration counter is greater than zero (610). If so, hashing tool 300 can generate the integer sequence and composition of permutations for the block $b_i$. To do so, hashing tool 300 can generate an integer in the sequence by computing s=y mod n (612). The hashing tool 300 can update the block permutation value $P_{c_i}$ such that $P_{c_i} = P_s \circ P_{c_i}$ (614). Hashing tool can update y by computing y=y/n (616) and the iteration counter r by decrementing r by 1 such that r=r−1 (618). After updating the iteration counter, hashing tool 300 can again check if the iteration counter is greater than zero (610). If so, hashing tool can repeat steps 612, 614, 616, and 618. Otherwise, hashing tool 300 can perform a last update of the block permutation value $P_{c_i}$ for a block $b_i$ such that $P_{c_i} = P_{c_i} \circ P_n$ (620). After performing the last update of the block permutation value $P_{c_i}$ for a block $b_i$, hashing tool 300 can resume previous processing, which can include resuming processing at step 512 of method 500 in FIG. 5.

Figure 7:
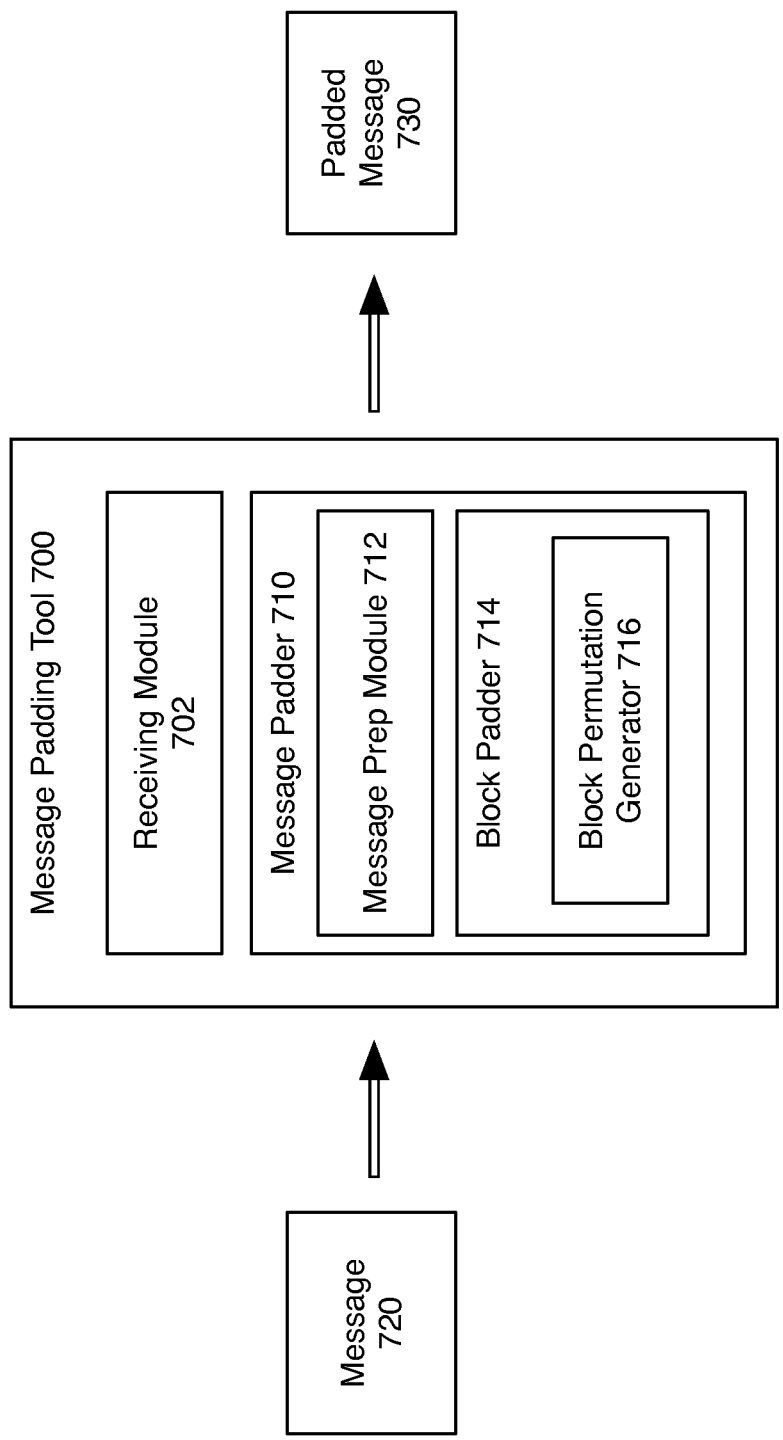
FIG. 7 illustrates an exemplary permutation composition message padding tool.

The permutation composition problem can also be used in the padding step prior to applying a hash function to a message. A permutation composition based padding function can be applied to a message using a message padding tool that receives a message and outputs a padded message. FIG. 7 illustrates an exemplary message padding tool 700. Message padding tool 700 takes as input message 720, which can be any sequence of bytes of any length.

Message padding tool 300 can include one or more modules for padding an input message 720, e.g., receiving module 702, message padder 710, message prep module 712, block padder 714, and block permutation generator 716. Each of the modules in FIG. 7 is discussed in more detail below; however, it should be understood by one skilled in the art, that the architectural configuration illustrated in FIG. 7 is simply one possible configuration and that other configurations with more or less components are also possible.

Message padding tool 700 can include receiving module 702. Receiving module 702 can be configured to receive input message 720 and pass input message 720 to message padder 710. Receiving module 702 can also be configured to receive other input values, such as block size, target hash function block size, and information identifying a set of permutations.

Message padder 710 can be configured to include one or more modules for generating a permutation composition based padded message from input message 720. Message padder 710 can include message prep module 712. Upon receiving input message 720, message prep module 712 can determine whether the length of input message 720 is a multiple of a specified block size, such as 56 bytes. In some cases, the block size can be an input to message padding tool 700. For example, a block size can be specified as a command line parameter to message padding tool 700. When message prep module 712 determines that input message 720 has a length that is not a multiple of the specified block size, message prep module 712 can pad input message 720 with enough junk bytes to reach the next multiple of the specified block size. For example, if the block size is 56 bytes and the message length is 106 bytes, message prep module 712 can pad the message with 6 junk bytes. Depending on the configuration, message prep module 712 can prepend the junk bytes to the beginning of input message 720 and/or append the junk bytes to the end of input message 720. The junk bytes can be a predefined byte, such as 0x00. Message prep module 712 can also be configured to use multiple junk bytes. For example, message prep module 712 can append a marker byte used to indicate the end of the message, such as 0x80. After the marker byte, message prep module 712 can complete the padding with padding bytes, such as 0x00. Once message prep module 712 has ensured that input message 720 has a length that is a multiple of a specified block size, message prep module 712 can split input message 720 into a sequence of blocks, where each block has a length equal to the specified block size.

After message prep module 712 splits input message 720 into a set of blocks, block padder 714 can pad the individual blocks in the message to achieve a target hash function block size. To do this block padder 714 can obtain a set of m+1 permutations $\{P_0, , P_{m-1}, P_m\}$ that permute a set of unique values from zero to n−1, [0, n−1]. For example, block padder 714 can obtain a set of 17 permutations, which permute 16 unique values. In some cases, block padder 714 can be configured so that m=n.

The set of permutations can be predefined in message padding tool 700. Alternatively, the set of permutations can be obtained based on input information identifying the set of permutations received by receiving module 702. For example, receiving module 702 may receive the set of permutations, such as in an input file. In another example, receiving module 702 may receive a permutation identifier that block padder 714 can use to select the set of permutations from a database of sets of permutations connected to or part of message padding tool 700. In yet another example, receiving module 702 may receive a seed value that block padder 714 can use to generate the set of permutations.

After obtaining the set of permutations, block padder 714 can apply block permutation generator 716 to each block in the message to generate a block permutation value for each block based on the set of permutations.

Block padder 714 can then represent the block permutation value as a q-byte value, such as an 8-byte value. For example, in the case where the set of permutations permutes the values [0,15], each permutation can be represented as an array of size 16 that contains values from 0 to 15. Then each block permutation value can be represented as an 8-byte value, each byte being a pair of nibbles, i.e. a couple of 4-bit values that are between 0 and 15. Then block padder 714 can combine the block and the q-byte value to generate a padded block of size (block size+q bytes). For example, if block size is 56 and the q-byte value is 8 bytes, the generated padded block will be 64 bytes.

Once each block in input message 720 has been processed, message padder 710 can re-assemble the blocks using the padded blocks to generate a padded message.

Figure 8:
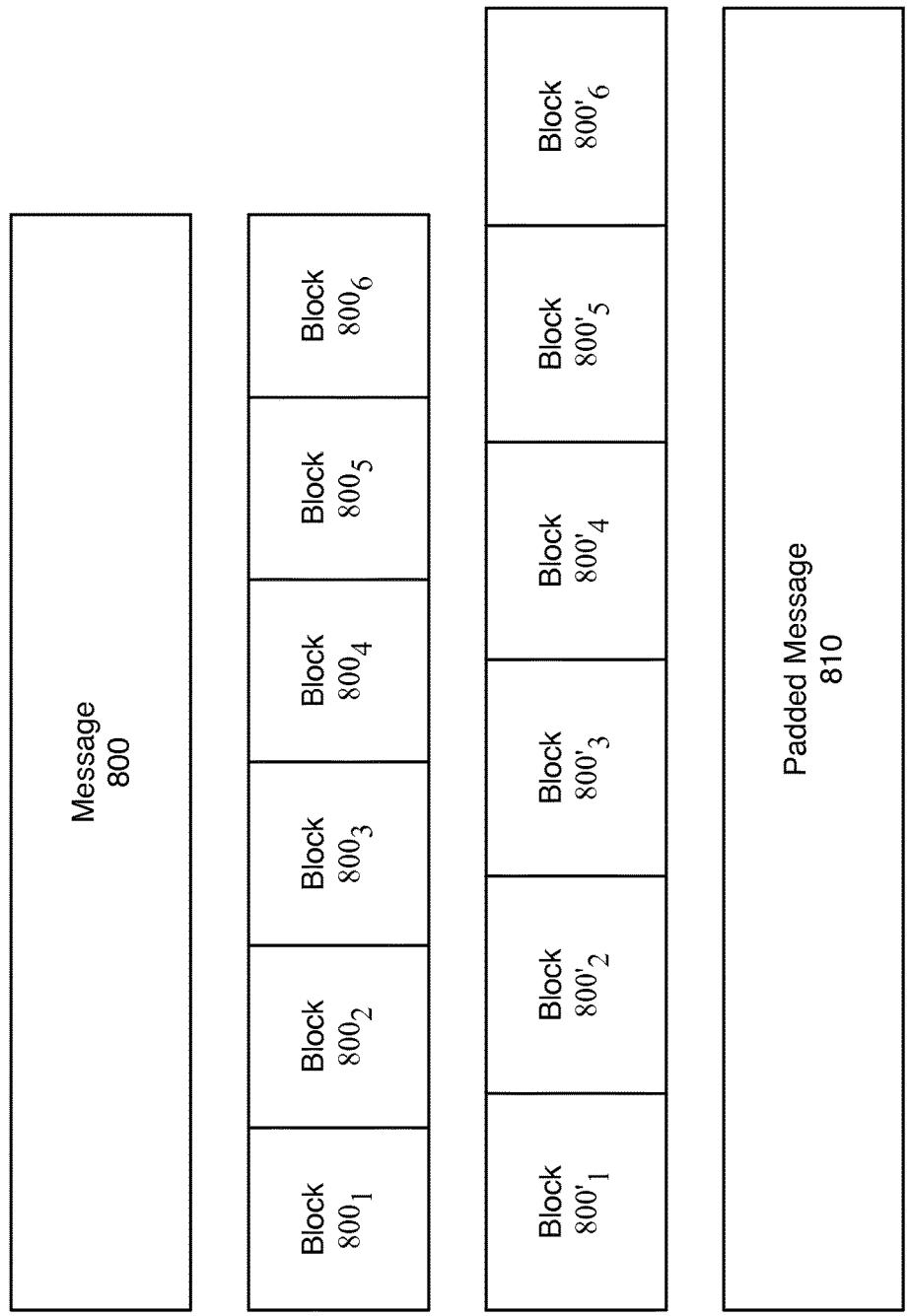
FIG. 8 illustrates message padding.

FIG. 8 illustrates the general idea of padding a message using a padding function that splits the message into equal size blocks and pads each block. The message padding begins with message 800. Message 800 is then split into a set of blocks, in this example, blocks $800_k, \ldots, 800_6$. For each of the blocks one or more bytes are added to the block to achieve a target hash function block size. Thus, each of the padded blocks $800'_1, \ldots, 800'_6$, is longer than the corresponding original block, and padded message 810 is correspondingly longer.

Figure 9:
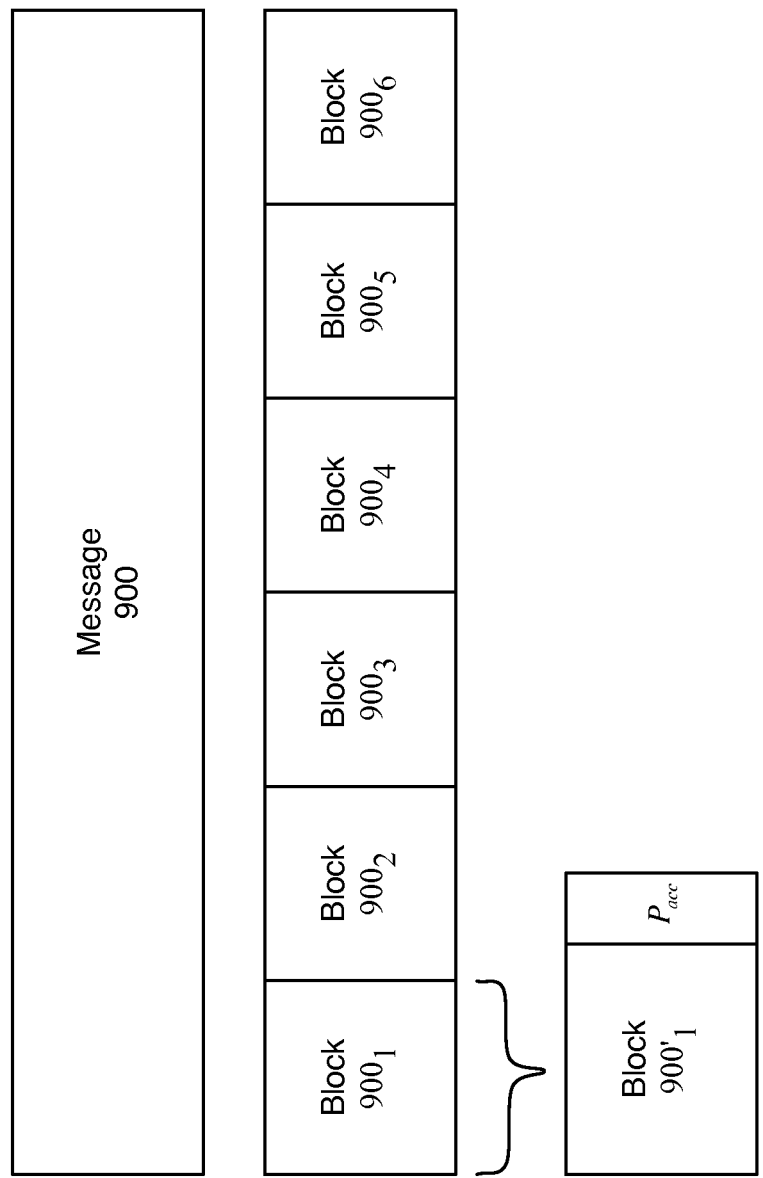
FIG. 9 illustrates block padding using permutation composition based padding.

FIG. 9 illustrates the general idea of padding a message using a permutation composition based padding function. The message padding begins with message 900. Message 900 is then split into a set of blocks, in this example, blocks $900_1, \ldots, 900_6$. Each block 900, has a length meeting the specified block size, e.g. 56 bytes. For each of the blocks, a block permutation value $P_{c_i}$ is generated. Then the q-byte representation of the block permutation value $P_{c_i}$ is added to the block to generate padded block $900'_i$. In this example, the padding bytes are appended to the end of the block. Alternative placements of the padding bytes are also possible, such prepending the padding bytes to the beginning of the block and/or a combination of prepending and appending.

The message padding, for a message M split into a set of blocks $\{b_0, , b_m\}$, where each block has a block size r, can be generated according to the pseudo code below for a given set of n+1 permutations $\{P_0, , P_{n-1}, P_n\}$ and a block permutation function $C_r(b_i)$:

```
for (i = 0; i <= m; i++){
    P_ci = Cr(bi);
        represent P_ci as a q-byte value;
        combine bi and P_ci;
}
recombine the blocks;
```

The block permutation value for a block $b_i$ can be generated using the same block permutation function $C_r(b_i)$ used in the permutation composition based hash function above, and reproduced here:

```
Pc = Pn;
y = bi;
for (i = 0; i < r; i++) {
    s = y % n /* generate the sequence from the block */
    Pc = Ps o Pc; /* composition of permutations */
    y = y / n; /* integer division */
}
Pc = Pc o Pn;
return Pc;
```

As with hashing tool 300, message padding tool 700 can include special purpose instructions that can be used to improve the efficiency of the permutation composition for permutations of size 16 or less, such as the SSE3 instruction set. This can improve the speed of the block permutation function $C_r(b_i)$, and the overall performance of the message padding.

A hash function can be applied to the permutation composition padded message to generate a hash value for the message. For example, any of the standard hash functions SHA1, SHA2, SHA2_256, SHA2_512, SHA3_256, SHA3_512, or MD5 can be used to generate a hash value using the padded message. Additionally, a permutation composition based hash function can be used to generate a hash value using the padded message.

Figure 10:
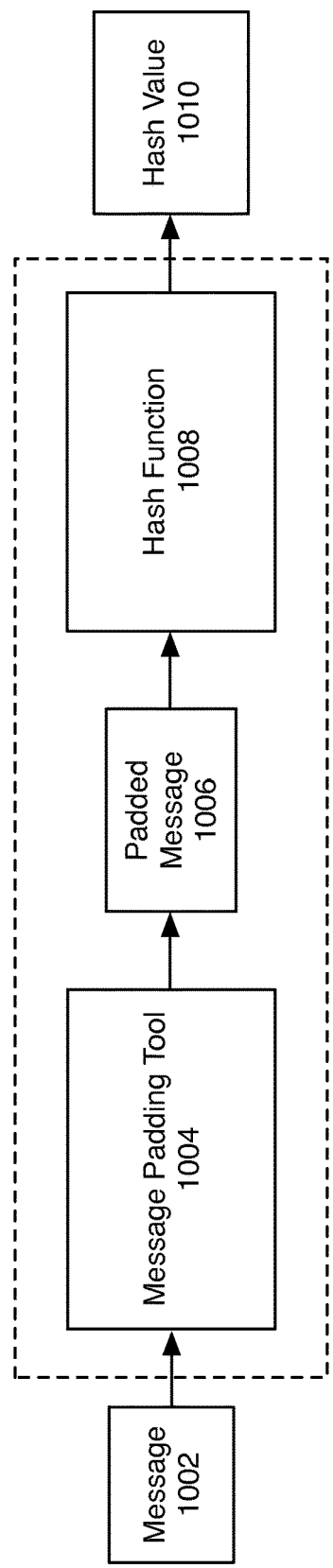
FIG. 10 illustrates an exemplary message hashing process that incorporates message padding.

FIG. 10 illustrates a message hashing process using message padding. In this example, message 1002 can be supplied to message padding tool 1004, such as message padding tool 7 in FIG. 7. Message padding tool 1004 can apply permutation composition based padding to generate padded message 1006. Padded message 1006 can then be supplied to hash function 1008, such a standard hash function or a permutation composition based hash function. Hash function 1008 can generate hash value 1010 for message 1002 using padded message 1006. In some cases, message padding tool 1004 and hash function 1008 can be different functions or modules in a same tool. For example, hashing tool 300 in FIG. 3 and message padding tool 700 in FIG. 7 can be in a same cryptographic system or tool. Additionally, the cryptographic system that includes both permutation composition based hashing and permutation composition based padding can include other hash functions and/or message padding functions.

Figure 11:
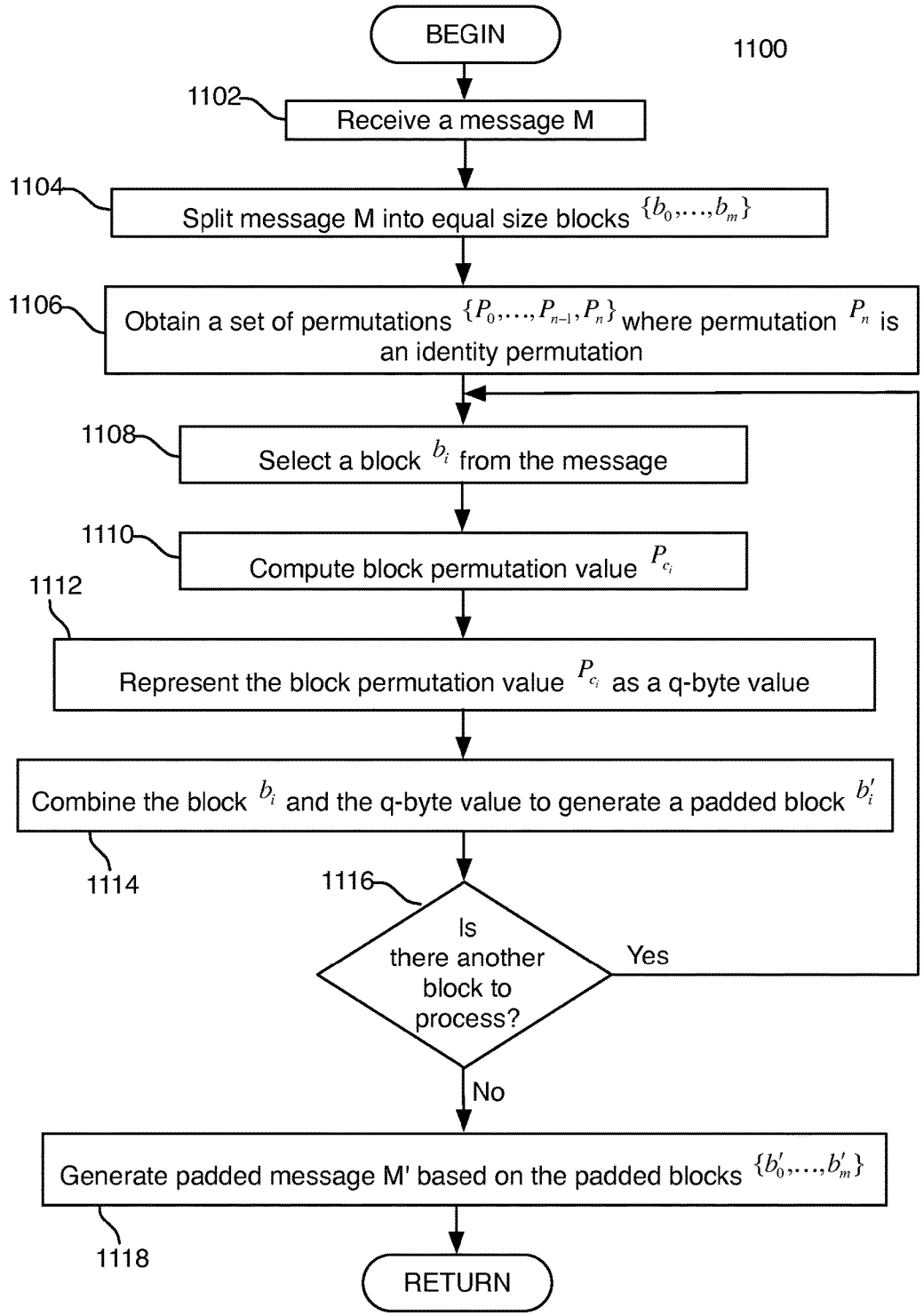
FIG. 11 illustrates an exemplary method embodiment for message padding using permutation composition based padding.

FIG. 11 is a flowchart illustrating exemplary method embodiment 1100 for padding a message using permutation composition based padding. For the sake of clarity, this method is discussed in terms of an exemplary message padding tool, such as is shown in FIG. 7. Although specific steps are shown in FIG. 11, in other embodiments a method can have more or less steps than shown.

At some point, message padding tool 700 can receive a message to be padded using the permutation composition based padding technique (1102). In addition to the message, message padding tool 700 can receive one or more other parameters, such as a block size, target hash function block size, or permutation identifying information. For example, message padding tool 700 may receive the set of permutations, such as in an input file. In another example, message padding tool 700 may receive a permutation identifier that message padding tool 700 can use to select the set of permutations from a database of sets of permutations connected to or part of message padding tool 700. In yet another example, message padding tool 700 may receive a seed value that message padding tool 700 can use to generate the set of permutations.

After receiving a message to pad, message padding tool 700 can split the message into a sequence of blocks $\{b_0, , b_m\}$, where each block has a length equal to a specified block size (1104), such as 56 bytes. In some cases, the length of the message may not be a multiple of the specified block size. When this occurs, message padding tool 700 can pad the message with enough junk bytes to reach the next multiple of the specified block size. The placement of the padding bytes can vary with the configuration. For example, message padding tool 700 can prepend and/or append the junk bytes to the message.

Message padding tool 700 can also obtain a set of n+1 permutations $\{P_0, , P_{n-1}, P_n\}$ where permutation $P_n$ is an identity permutation (1106). For example, message padding tool 700 can obtain a set of 17 permutations that permute 16 unique values. The set of permutations can be predefined in message padding tool 700 or can be obtained based on input information identifying the set of permutations. For example, message padding tool 700 may receive the set of permutations, a permutation identifier that can be used to select the set of permutations from a database, or a seed value that message padding tool 700 can use to generate the set of permutations.

Once message padding tool 700 has split the message and obtained the set of permutations, message padding tool 700 can begin padding the blocks. Message padding tool 700 can select a block $b_i$ from the message (1108) and compute a block permutation value $P_{c_i}$ for the block $b_i$ (1110). The message padding tool 700 can compute the block permutation value $P_{c_i}$ using a variety of techniques, such as the block permutation value computation in method 600 in FIG. 6, described above. Using the block permutation value $P_{c_i}$, message padding tool 700 can represent the block permutation value $P_{c_i}$ as a q-byte value (1112), such as an 8-byte value. Then message padding tool 700 can combine the block $b_i$ and the q-byte value $P_{c_i}$ to generate a padded block (1114).

After generating the padded block $b_i'$, message padding tool 700 can determine whether there is another block in the message block sequence to process (1116). If there is another block, message padding tool 700 can repeat the process of selecting a block (1108), computing the block permutation value for the selected block (1110), representing the block permutation value as a q-byte value (1112), and combining the values to produce a padded block (1114).

Once each block in message has been processed, message padding tool can re-assemble the blocks using the padded blocks $\{b_0', , b_m'\}$ to generate a padded message M' (1118). After recombining the blocks to generate the padded, message padding tool 700 can resume previous processing, which can include repeating method 1100.

FIG. 12A, and FIG. 12B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 12A illustrates a conventional system bus computing system architecture 1200 wherein the components of the system are in electrical communication with each other using a bus 1205. Exemplary system 1200 includes a processing unit (CPU or processor) 1210 and a system bus 1205 that couples various system components including the system memory 1215, such as read only memory (ROM) 1220 and random access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware module or software module, such as module 1 1232, module 2 1234, and module 3 1236 stored in storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric.

To enable user interaction with the computing device 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing device 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, display 1235, and so forth, to carry out the function.

FIG. 12B illustrates a computer system 1250 having a chipset architecture that can be used in executing the described method and generating and displaying a graphical user interface (GUI). Computer system 1250 is an example of computer hardware, software, and firmware that can be used to implement the disclosed technology. System 1250 can include a processor 1255, representative of any number of physically and/or logically distinct resources capable of executing software, firmware, and hardware configured to perform identified computations. Processor 1255 can communicate with a chipset 1260 that can control input to and output from processor 1255. In this example, chipset 1260 outputs information to output 1265, such as a display, and can read and write information to storage device 1270, which can include magnetic media, and solid state media, for example. Chipset 1260 can also read data from and write data to RAM 1275. A bridge 1280 for interfacing with a variety of user interface components 1285 can be provided for interfacing with chipset 1260. Such user interface components 1285 can include a keyboard, a microphone, touch detection and processing circuitry, a pointing device, such as a mouse, and so on. In general, inputs to system 1250 can come from any of a variety of sources, machine generated and/or human generated.

Chipset 1260 can also interface with one or more communication interfaces 1290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1255 analyzing data stored in storage 1270 or 1275. Further, the machine can receive inputs from a user via user interface components 1285 and execute appropriate functions, such as browsing functions by interpreting these inputs using processor 1255.

It can be appreciated that exemplary systems 1200 and 1250 can have more than one processor 1210 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system to generate a permutation composition based message hash value for cryptographic messaging, the system comprising:
   a non-transitory machine readable storage device storing instructions; one or more hardware processors to execute the instructions on the machine readable storage device, wherein the instructions, when executed cause the one or more hardware processors to perform operations, the operations comprising:
   receiving an input message and information identifying a predefined set of permutations unrelated to the input message, wherein the input message and the predefined set of permutations are stored in a storage;
   determining whether a length of the stored message is a multiple of a defined block size, upon a determination that the length is not a multiple of the defined block size, pad the message to achieve a length that is a multiple of the defined block size, and split the message into a set of blocks, each block having a length of the defined block size; and
   generating a permutation composition hash value for the message, including:
   initializing a current accumulated permutation value to a permutation from the predefined set of permutations and, for each block in the set of blocks:
   computing a block permutation value, including for a block size number of iterations, perform a set of iterative operations to:
   update a current block permutation value via a composition of the current block permutation value with a permutation based on a generated integer from the set of permutations; and
   generate the block permutation value by composing the current block permutation value with a permutation from the set of permutations; and
   updating the accumulated permutation value via a composition of the current accumulated permutation value with the block permutation value; and
   generating the permutation composition hash value based on the accumulated permutation value; and
   outputting, through an interface, the permutation composition hash value to securely communicate the message to a computing device.

2. The system of claim 1, wherein computing a block permutation value for the block further includes:
   initializing a current block permutation value to the permutation from the set of permutations;
   initializing a block value to the value of the block; and
   for the block size number of iterations, perform the set of iterative operations to:
   generate the integer from an integer sequence, the integer equal to the block value modulo a count of permutations in the set of permutations; and
   update the block value by dividing the block value by one less than a count of permutations in the set of permutations.

3. The system of claim 2, wherein the information identifying the set of permutations is at least one of the set of permutations, a file containing the set of permutations, or a permutation identifier to enable obtaining of the set of permutations.

4. The system as in claim 2, wherein the information identifying the set of permutations additionally includes a seed value to enable the message hash generator to generate the set of permutations.

5. The system of claim 2, wherein to generate the permutation composition hash value based on the accumulated permutation value includes to extract at least a first bytes of the accumulated permutation value, a last bytes of the accumulated permutation value, and an exclusive OR of two or more bytes of the accumulated permutation value.

6. The system of claim 2, wherein padding the message includes appending or prepending one or more bytes to the message until the length is a multiple of the defined block size.

7. The system of claim 6, wherein the defined block size is 64 bytes, the set of permutations includes 256 permutations that permute 1024 unique values.

8. A non-transitory machine-readable medium storing instructions which, when executed by one or more hardware processors, cause the one or more hardware processors to perform operations to generate a permutation composition hash value for cryptographic messaging, the operations comprising:
  receiving an input message and information identifying a predefined set of permutations from a file unrelated to the input message, wherein the input message and the predefined set of permutations are stored in a storage;
  determining whether a length of the stored message is a multiple of a defined block size, upon determining that the length is not a multiple of the defined block size, padding the message to achieve a length that is a multiple of the defined block size and splitting the message into a set of blocks, each block having a length of the defined block size; and
  obtaining the predefined set of permutations based on the information identifying the set of permutations; and
  generating a permutation composition hash value for the input message, wherein generating the permutation composition hash value for the input message includes:
  initializing a current accumulated permutation value to a permutation from the predefined set of permutations;
  for each block in the set of blocks computing a block permutation value for a block, wherein computing the block permutation value includes,
  initializing a current block permutation value to a permutation from the defined set of permutations;
  initializing a block value to the value of the block; for a block size number of iterations, iteratively computing an integer sequence and composition of permutations for the block and updating the block value via a division of the block value by a number based on a count of permutations in the set of permutations and generating the block permutation value by composing the current block permutation value with the permutation from the set of permutations;
  updating the accumulated permutation value via a composition of the current accumulated permutation value with the block permutation value; and
  generating the permutation composition hash value for the input message based on the accumulated permutation value after processing each block in the input message; and
  outputting, through an interface, the permutation composition hash value to securely communicate the message to a computing device.

9. The non-transitory machine-readable medium as in claim 8, wherein computing the integer sequence and composition of permutations for the block includes:
  computing an integer in the integer sequence, the integer equal to the block value modulo a count of permutations in the set of permutations; and
  updating the current block permutation value via a composition of the current block permutation value with permutation from the set of permutations.

10. The non-transitory machine-readable medium as in claim 8, wherein padding the message comprises prepending a predefined padding byte to the message until the length is a multiple of the defined block size.

11. The non-transitory machine-readable medium as in claim 10, wherein the defined block size is 64 bytes, the set of permutations includes 256 permutations that permute 1024 unique values.

12. A system to generate a permutation composition based message hash value for a padded message for cryptographic messaging, the system comprising:
  a non-transitory machine readable storage device storing instructions;
  one or more hardware processors to execute the instructions on the machine readable storage device, wherein the instructions, when executed cause the one or more hardware processors to perform operations, the operations comprising:
  receiving a message and storing the message in a storage;
  splitting the message into a set of blocks;
  obtaining a predefined set of permutations from an input file not related to the message, the predefined set of permutations including an identity permutation; for each block in the set of blocks,
  iteratively performing a set of operations to compute a block permutation value for the block, wherein the set of operations include computing an integer in an integer sequence, the integer equal to the block value modulo a count of permutations in the set of permutations,
  representing the block permutation value as a block value of predetermined byte length,
  combining the block and the block value to generate a padded block, and generating a padded message based on the generated padded block;
  applying a permutation composition hash function to the padded message to generate a permutation composition based hash value for the message: and
  outputting, through an interface, the permutation composition hash value to securely communicate the message to a computing device.

13. The system of claim 12, wherein splitting the message into the set blocks includes padding the message to generate a padded message having a message length, the message length a multiple of a length of a block in the set of blocks and split the padded message into the set of blocks.

14. The system of claim 13, wherein padding the message includes:
  appending a predefined marker byte to the message to generate the padded message;
  determining a number of bytes to cause the length of the message to be a multiple of the length of a block in the set of blocks; and
  appending one or more predefined padding bytes to the message.

15. A non-transitory machine-readable medium storing instructions which, when executed by one or more hardware processors, cause the one or more hardware processors to perform operations to generate a hash value of a padded message for cryptographic messaging, the operations comprising:
  receiving a message and storing the message in a storage;
  splitting the stored message into a set of blocks;
  obtaining a predefined set of permutations from an input file unrelated to the message, the predefined set of permutations including an identity permutation;
  for each block in the set of blocks, iteratively performing a set of operations including:
  computing a block permutation value for the block using the predefined set of permutations including computing an integer in an integer sequence, the integer equal to the block value modulo a count of permutations in the set of permutations;
  representing the block permutation value as a fixed-byte permutation value of predetermined byte length;
  combining the block and the fixed-byte permutation value to generate a padded block; and generating a padded message based on the generated padded block;

applying a permutation composition hash function to the padded message to generate a permutation composition based hash value for the message: and outputting, through an interface, the permutation composition hash value to securely communicate the message to a computing device.

16. The non-transitory machine-readable medium as in claim 15, wherein splitting the message into the set blocks includes:

padding the message to generate a padded message having a message length, the message length a multiple of a length of a block in the set of blocks; and splitting the padded message into the set of blocks.

17. The non-transitory machine-readable medium as in claim 16, wherein padding the message includes:

appending a predefined marker byte to the message to generate the padded message;

determining a number of bytes to cause the length of the message to be a multiple of the length of a block in the set of blocks; and appending one or more predefined padding bytes to the message.

18. The non-transitory machine-readable medium as in claim 17, wherein the predefined marker byte is 0x80 and the predefined padding byte is 0x00.

* * * * *